Figure 1:
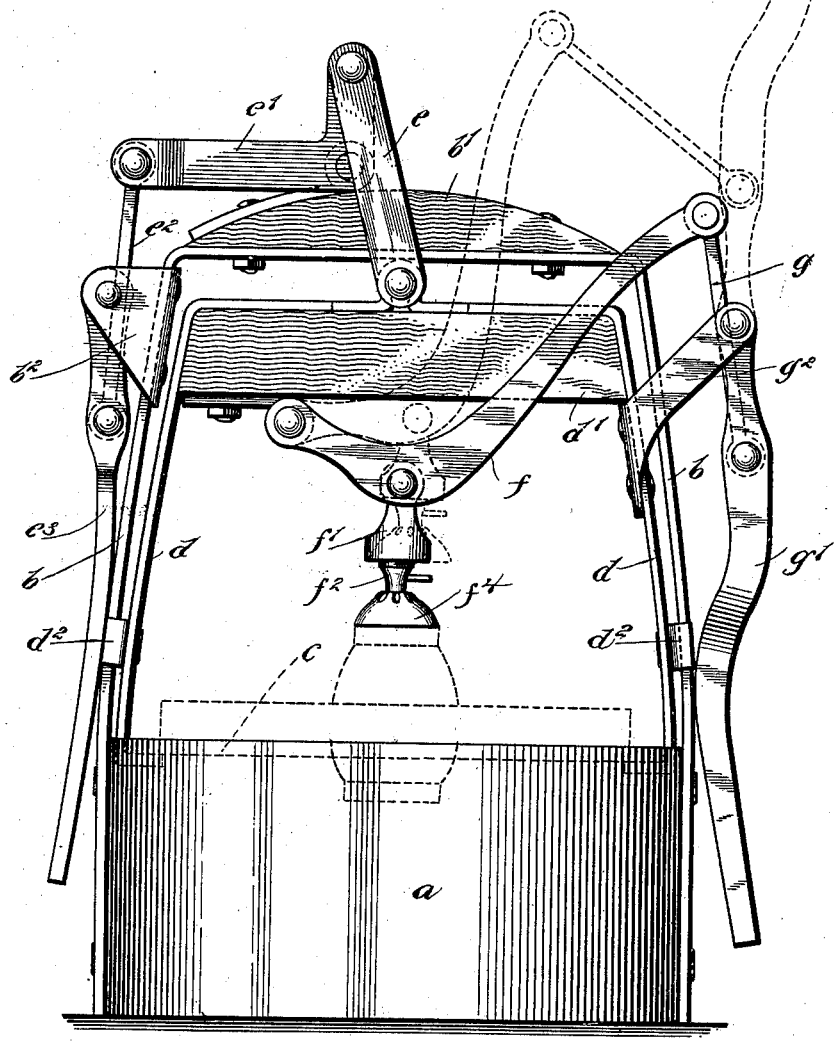

No. 668,449. Patented Feb. 19, 1901.
M. M. MAY.
WHEELWRIGHT'S IMPLEMENT.
(Application filed Nov. 8, 1900.)
(No Model.) 2 Sheets—Sheet 1.

WITNESSES:
INVENTOR
Michael M. May.
BY
ATTORNEYS:

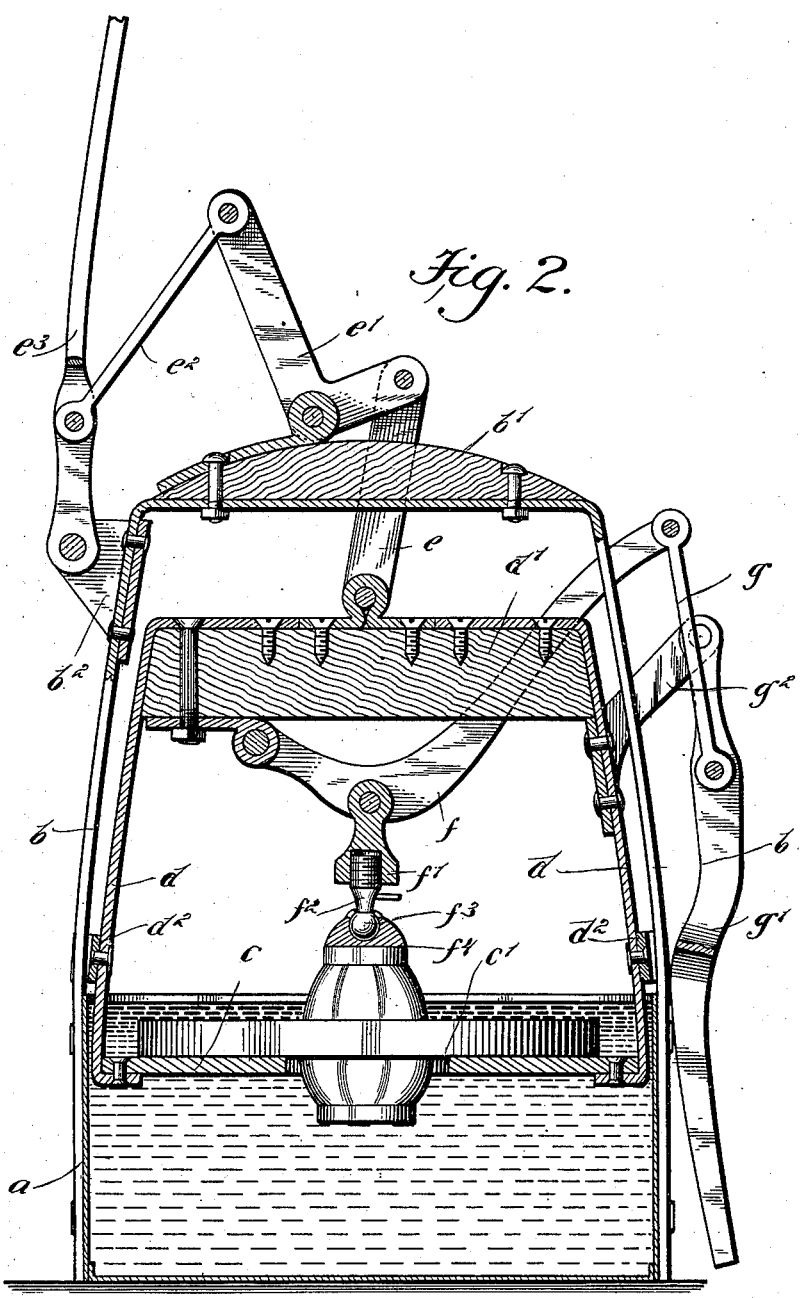

UNITED STATES PATENT OFFICE.

MICHAEL MATHEW MAY, OF RULO, NEBRASKA, ASSIGNOR OF ONE-HALF TO WILLIAM GOLDNER, OF FALLS CITY, NEBRASKA.

WHEELWRIGHT'S IMPLEMENT.

SPECIFICATION forming part of Letters Patent No. 668,449, dated February 19, 1901.

Application filed November 8, 1900. Serial No. 35,837. (No model.)

*To all whom it may concern:*

Be it known that I, MICHAEL MATHEW MAY, a citizen of the United States, and a resident of Rulo, in the county of Richardson and State of Nebraska, have invented a new and Improved Wheelwright's Implement, of which the following is a full, clear, and exact description.

This invention relates to a peculiarly-constructed machine for holding vehicle-wheels during the application of the tire thereto and for permitting the wheels to be submerged in a tank immediately after the tire is placed in position, so as to cool the tire and shrink it on the felly. The machine is also useful for truing vehicle-wheels to take the "dish" out of them, and, still further, it serves to prevent the dishing of wheels during the application of the tire, all as will fully appear hereinafter.

This specification is the disclosure of one form of the invention, while the claims define the actual scope thereof.

Reference is to be had to the accompanying drawings, forming a part of this specification, in which similar characters of reference indicate corresponding parts in both views.

Figure 1 is a side view of the apparatus, showing by dotted lines the various positions of the clamping devices; and Fig. 2 is a sectional view fully illustrating the operation of the parts.

$a$ represents a tank, which is here shown to be cylindrical in form and which forms the base of the apparatus. Mounted rigidly on the tank is a framing comprising two side bars $b$ and a horizontal top bar $b'$, and arranged within the tank is a circular plate or bed $c$, adapted to carry the wheel, as shown by full lines in Fig. 2, and formed with a centrally-located orifice $c'$, through which the hub of the wheel may be passed. This bed is carried by a U-shaped frame having side bars $d$ and a top bar $d'$. The side bars $d$ have guides $d^2$ attached thereto, the guides running on the side bars $b$ of the stationary frame, so as to guide the vertical movement of the bed-frame, permitting the frame to move up to the position indicated by dotted lines in Fig. 1 or downward to the position shown by full lines in Fig. 2. The frame of the bed $c$ is hung on the main frame by two links $e$, which are pivoted to the horizontal beam $d'$ and straddle the beam $b'$. The links $e$ are connected at their upper end to a bell-crank lever $e'$, the other arm of which is connected by a link $e^2$ with a hand-lever $e^3$, fulcrumed between projecting lugs $b^2$ of the main frame. By throwing this lever $e^3$ from the position shown in Fig. 1 to that shown in Fig. 2 the bed-frame and the bed attached thereto may be moved downward to submerge the wheel in the water in the tank $a$, and by throwing the lever $e^3$ back, as shown in Fig. 1, the bed will be raised, and thus hold the wheel out of the water and in position to be conveniently worked upon by the wheelwright to place the tire on the wheel or to perform any other work that it is desired to do.

The bed-frame carries devices for clamping the wheel on the bed, such devices moving freely with the frame and being independent of the tank and the main frame thereon. These devices comprise two clamping-levers $f$, which are fulcrumed to the under side of the beam $d'$. But one of these levers is shown in the drawings. They are, however, mere duplications of each other, and in operation they are essentially one. To these levers $f$ is pivotally connected a short arm $f'$, in which works a screw $f^2$, and this screw carries a ball $f^3$, fitting loosely in a socket formed in a clamp $f^4$, which is adapted to engage the hub of the wheel, so as to clamp it down on the bed $c$, as shown. The levers $f$ straddle the beam $d'$ and also straddle one of the side bars $b$ of the main frame, the levers projecting laterally beyond the said side bar and being connected by a link $g$ with a hand-lever $g'$, which is fulcrumed on two arms $g^2$, projecting rigidly from the adjacent side bar $d$ of the bed-plate frame. By throwing the hand-lever $g'$ the clamping-lever $f$ may be moved to engage the clamp $f^4$ with or disengage it from the hub, and also by adjusting the screw $f^2$ in the arm $f'$ the clamp may be caused to engage the hub of the wheel more or less firmly, as desired.

In using this device the wheelwright may place the wheel on the bed-plate, and it will thus serve to prevent the dishing of the wheel, and should the wheel be dished previous to its being placed in the apparatus this dish may be taken out of it by pressing down the wheel on the bed-plate, as explained. When the tire is placed on the wheel hot, by throwing up the lever $e^3$ the wheel may be submerged in the water in the tank and the tire thus cooled and shrunk into place. The invention may also be used in various other ways, as will be apparent to skilled wheelwrights.

Having thus described my invention, I claim as new and desire to secure by Letters Patent—

1. The combination of a tank, a main framing erected thereon, a bed arranged in the tank, a bed-frame attached to the bed, a link-and-lever mechanism connected with the main framing and the bed-frame to sustain the bed on the main frame and to move the bed into and out of the tank, a clamp adapted to hold a wheel on the bed, a clamping-lever fulcrumed on the bed-frame and connected with the clamp, and a link and lever carried on the bed-frame and connected with the clamping-lever to operate the same.

2. In a wheelwright's implement, the combination of a rigidly-sustained main frame, a bed, a bed-frame attached to the bed and arranged within the main frame, means connected with the two frames for raising and lowering the bed and bed-frame, and a clamping device mounted on the bed-frame and working with the bed.

3. A wheelwright's implement, having a tank, a main frame rigidly sustained thereon, a bed arranged within the tank, a bed-frame attached to the bed, means extending between the bed-frame and main frame for raising and lowering the bed-frame and bed, and a clamping device carried by the bed-frame and working with the bed, for the purpose specified.

In testimony whereof I have signed my name to this specification in the presence of two subscribing witnesses.

MICHAEL MATHEW MAY.

Witnesses:
  C. F. REANIS,
  B. F. MILES.